Patented May 27, 1952

2,598,424

UNITED STATES PATENT OFFICE 2,598,424

PRODUCTION OF CYCLOPENTADIENE-TALL OIL COMPOSITIONS

Carl F. Peters, Chicago, Ill., assignor to Velsicol Corporation, Chicago, Ill., a corporation of Illinois No Drawing. Application October 9, 1946, Serial No. 702,089

11 Claims. (Cl. 260—97.5)

1

This invention relates to new and useful classes of compositions of matter and to methods of producing them.

More particularly, the invention relates to the products produced by thermally reacting cyclopentadiene with tall oil.

One object of this invention is to provide a new type of synthetic surface coating material having particular utility in the paint and varnish field.

Another object of the invention is to provide a new type of synthetic surface coating material which dries very rapidly in air to form a hard, glossy film of pale color.

Another object of the invention is to provide varnish and lacquer coating compositions, the films of which possess excellent resistance to acid, alkali, and water.

Another object of the invention is to provide a modified and improved tall oil which dries substantially faster than the parent, unmodified oil and which forms films characterized by markedly improved resistance to acid, alkali, and water.

Another object of the invention is to convert tall oil, which is a liquid material, into a hard, high-melting resinous material which is useful in surface coating compositions.

Another object of the invention is to provide an improved and modified thermally polymerized cyclopentadine resin possessing enhanced flexibility and resistance to oxidation.

Another object of the invention is to provide a new and synthetic type of drying oil, and one which is useful as an additive to the usual types of drying oils.

These and other objects of my invention, and the manner in which they are accomplished, will become apparent on consideration of this specification and the claims.

Tall oil is a by-product from sulfate wood pulp digestion and consists mainly of resin acids and fatty acids. It has been an inexpensive and plentiful raw material for many years, but, due to the availability of such oils as tung oil and linseed oil up until World War II, has never been exploited to any great extent in the field of oleoresinous surface coatings. The shortage of all types of drying oils has recently stimulated much research in this field, and fairly satisfactory drying oils and varnishes have been prepared from tall oil, usually by modifying it with small percentages of maleic anhydride and subsequently esterifying the resultant product with a polyhydric alcohol such as glycerine or pentaerythritol. Satisfactory alkyd resins have also been prepared by substituting tall oil for a portion of the usual amounts of fatty acids. However, all such products require the use of glycerine or more expensive substitutes; and the scarcity of fats and oils has caused a corresponding shortage of glycerine, which limits the volume of production of these drying oil substitutes. Furthermore, a tall oil esterified with glycerine is too soft to form a satisfactory resin and contains insufficient esterified fatty acids to give varnish films which have satisfactory flexiblity.

It is known that cyclopentadiene can be polymerized thermally or with the aid of small percentages of catalysts such as anhydrous halides of aluminum, iron, tin, and zinc, boron trifluoride, and mineral acids. The resins produced by catalytic polymerization are, in general, rather dark in color (3 to 8 Barrett scale) and have marked staining characteristics. They are difficultly soluble in drying oils, and resin films become progressively brittle as aging occurs. Thermal polymerization of cyclopentadiene or its cyclic diene Diels-Alder polymers at temperatures above 390° F., while obviating the use of catalysts and subsequent neutralization difficulties, produces resinous polymers which are pale in color (1 to 3 Barrett scale) but which are also difficultly soluble in drying oils and not very stable to prolonged heating above 525° F. Heating cyclopentadiene at temperatures below 390° F. results essentially in the formation of crystalline diene polymers of the monomer, the polymerization proceeding via a 1, 2; 1, 4 addition. These products are of relatively low molecular weight, non-resinous, and as such find no application in the field of oleoresinous materials.

I have discovered that an extremely useful reaction between cyclopentadiene and tall oil can be induced thermally at temperatures essentially above 400° F. This reaction results in the formation of new resinous and liquid products which are pale in color (1 to 3, Barrett scale), and which are soluble in drying oils as well as in the usual paint and varnish solvents and thinners. By employing temperatures essentially in excess of 400° F., together with appropriate reaction time and concentrations of the reactants, the production of the undesirable Diels-Alder polymers previously mentioned is prevented, and the polymerization and copolymerization proceed via the normal olefinic type polymerization, resulting in reaction products whose molecular weight, color, melting point, acid number, and solubility characteristics depend upon the time, the temperature at which the reaction is carried out, the concentrations of reactants, and solvents employed, if any.

I have also found that the thermally induced reaction between cyclopentadiene and tall oil results in an appreciable drop in the acid number of the initial reaction mixture, which is probably due to acylation of the unsaturated positions in the thermally produced cyclopentadiene polymers and cyclopentadiene-tall oil copolymers by the acidic constituents of the tall oil. It is known that esters can be formed by the reaction between olefins and acids, such reactions being usually induced by catalysts such as dilute sulfuric acid or boron trifluoride. Thus, ethyl acetate is formed by reacting ethylene with acetic acid, and cyclohexyl acetate by reacting cyclohexene with acetic acid, both reactions being catalyzed by dilute sulfuric acid. These reactions also occur in the absence of catalysts at considerably higher temperatures, but the yield of esters is lower and more by-products are formed. This type of esterification, then, proceeds under the reaction conditions herein disclosed, and the products produced by the described procedures have acid numbers appreciably lower than the initial reaction mixtures. When percentages of tall oil less than about thirty per cent are used, as much as ninety per cent reacts to form esterified resinous products. As the percentage of tall oil in the reaction mixture is increased, the products approach the liquid state, and the acid number increases accordingly. Products containing seventy per cent or more of tall oil are viscous liquids which are useful as synthetic drying oils, and which may be reacted further with polyhydric alcohols to form varnish vehicles which dry more rapidly and have better resistance to water, acid, and alkali than do tall oil-polyhydric alcohol reaction products.

By treating tall oil with cyclopentadiene as herein disclosed, not only are very useful products produced, but substantial economy in glycerine consumption is effected. For example, a tall oil which has an acid number of about 170, when reacted thermally with thirty per cent by weight of cyclopentadiene according to the process of my invention requires only fifty per cent as much glycerine to complete the esterification as would be necessary to esterify the untreated tall oil. Furthermore, the final product is far superior to the tall oil-glycerine esters with respect to hardness, drying, and resistance to water, acid, and alkali.

In preparing the resinous and liquid products herein described I prefer to employ a fairly pure (95 to 100 per cent) cyclopentadiene, or similarly pure polymers of cyclopentadiene such as dicyclopentadiene or the $C_5H_6$ cyclic diene Diels-Alder polymers of cyclopentadiene (as, for example, the trimer, tetramer or pentamer) which presumably break down to and react as the monomer in the process of my invention; but the invention is not limited to such grades of purity for the hydrocarbon reactants; and hydrocarbon fractions containing essentially cyclopentadiene, its dimer, or the $C_5H_6$ cyclic diene Diels-Alder polymers thereof, such as special cuts of "crude solvent naphtha" and by-products obtained by the cracking of gaseous hydrocarbon mixtures, etc., may also be used as sources of cyclopentadiene in the reaction.

Various grades of tall oil containing different ratios of fatty acids to resin acids may also be used within the scope of this invention, although I prefer to employ a clarified and refined tall oil in order to obtain the desired pale reaction products with cyclopentadiene. For such purpose, the tall oil may be refined by known treatment such as with hydrocarbon solvent, by distillation, by employment of acids such as sulfuric acid or hydrogen chloride, or combinations of such methods for removal of coloring substances such as oxidized resin acids contained in crude tall oil.

In preparing the products of my invention, I prefer to employ reaction temperatures essentially above 400° F., and usually between 400° F. and 650° F., although even higher temperatures may be used in some cases. The reaction is conducted in the liquid phase and for such purpose adequate superatmospheric pressure is employed correlative to the reaction temperature. Thus at the lower temperature indicated, the pressure will be about 25 to 50 pounds per square inch while pressures of 300 pounds per square inch or more may be employed at the higher reaction temperatures. The reaction may be carried out in the presence or absence of air. Solvents for the reactants, inert with respect thereto, may or may not be used. The time and temperature employed in any given reaction are dependent upon such factors as (1) the percentage of tall oil in the reaction mixture, (2) the acid number of the tall oil, (3) the said number of the desired product, (4) the melting point and color of the desired product, (5) the viscosity of the desired product, (6) the amount of solvent used, if any, and (7) the desired solubility characteristics of the product. In general, high reaction temperatures and/or prolonged reaction periods result in products which are high-melting or high in viscosity, depending upon the percentage of tall oil used. Also, such reaction conditions result in products which are darker in color and higher in molecular weight and which have a higher percentage of acylation and lower order of solubility in drying oils than products which are formed at lower reaction temperatures and shorter reaction periods. The effect of varying the above mentioned factors will be brought out in the examples hereinafter recited.

The reactions herein described may be carried out in sealed pressure vessels, such as those which are heated externally by a liquid maintained at the appropriate temperature, or the reactants may be passed continuously or circulated through a reaction tube which is heated externally by a heat exchange medium. The products may also be produced by employing a continuous type reaction unit, whereby tall oil, admixed with cyclopentadiene, its cyclic diene Diels-Alder polymers, or concentrates containing essentially these materials, are fed into a reaction tube, the temperature and time of reaction being governed by the properties desired in the finished products.

In a preferred embodiment of my invention, I react a mixture of cyclopentadiene (95 to 5 parts) or its diene polymers with tall oil (5 to 95 parts) by heating the reactants in a sealed vessel or in a continuous type reactor of the type previously described. However, the products of my invention may also be produced by heating cyclopentadiene or its diene Diels-Alder polymers, e. g. dicyclopentadiene, tricyclopentadiene, tetracyclopentadiene, etc., all of which are crystalline and non-resinous, for relatively short periods of time at temperatures between approximately 400 and 550° F., at which temperatures the said diene polymers of cyclopentadiene are unstable, thereby forming liquid and solid resinous polyene cyclopentadiene polymers which are highly unsaturated in character (typically with an Iodine number 200–225, Wijs method) and adding tall oil to these polymers, subsequently heating the mixture at appropriate temperatures (e. g. 400 to 650° F.) until the desired products are obtained. The products resulting from either type of reaction are quite similar, but the time required when the second procedure is used is usually considerably longer than when the reactants are mixed previous to the heat treatment. The products formed by employing the latter type reaction usually have higher acid numbers, but this property is quite useful in many applications.

The solid, resinous reaction products herein described may be incorporated directly into drying oils to produce oleoresinous vehicles which are pale in color; the varnish films are characterized by their short drying time, high gloss, and excellent resistance to water, acid, and aqueous alkali. The liquid products, which have acid numbers above 50 to 60 may be reacted with polyhydric alcohols such as glycerine, pentaerythritol, ethylene glycol, etc., such products being satisfactory drying oil substitutes or synthetic resins, depending upon the amount and type of alcohols used. Such oils and resins have greatly improved drying properties and resistance to water, acids, and alkali due to the chemically combined cyclopentadiene.

The following examples are illustrative of the products which may be produced from tall oil and cyclopentadiene, but the scope of the invention is not limited to the percentage of reactants nor to the reaction conditions which are described in each example.

*Example I*

A mixture of 100 g. of cyclopentadiene (B. P. 41–42° C.) and 50 g. of refined tall oil A (55% fatty acids, 37% rosin acids; acid No. 165) is placed in a stainless steel bomb, and the sealed bomb heated at 500° F. for five hours. The product is a hard, clear, pale colored resin, which has the following properties: M. P. 184° F. (ball and ring); color 9+ (Hellige scale); acid number 7.9. The resin is soluble in aromatic and naphtha solvents, and in raw and bodied linseed oils. A 20 gallon length bodied linseed oil varnish, 50 per cent solids in mineral spirits, has a 7 color (Hellige) and E viscosity (Gardner). The drop in said number of the reaction mixture indicates that about 86 per cent of the acids originally presented in the reaction mixture are present as esters in the reaction product.

*Example II*

A mixture of 100 g. of cyclopentadiene and 80 g. of tall oil A is heated in a stainless steel bomb, nitrogen atmosphere, at 525° F. for four hours. The product is a soft solid at room temperature; color 12 (Hellige); acid number 18.7. It is compatible with heavy bodied drying oils, and soluble in aromatic and naphtha solvents. This product may be incorporated directly into drying oils, or may be esterified with an equivalent amount of polyhydric alcohol to form very useful resinous products which, due to their flexibility, greatly reduce the amount of drying oil required in any given varnish vehicle. The drop in acid number of the reaction mixture indicates that 76.7 per cent of the acids originally present in the reaction mixture are present as esters in the product.

*Example III*

A mixture of 150 g. of cyclopentadiene and 60 g. of tall oil A is heated in a stainless steel bomb, nitrogen atmosphere, for five hours at 500° F. The product is a clear, pale yellow, solid resin which has the following properties: M. P. 210°; color 8+ (Hellige); acid number 5.1. The resin is soluble in aromatic and naphtha solvents, and in bodied drying oils. A 20 gallon length bodied linseed oil varnish, 50 per cent solids in mineral spirits, has a 6–7 color (Hellige), and E viscosity (Gardner). The drop in acid number of the reaction mixture indicates that 90 per cent of the acids originally present in the reaction mixture are present as esters in the product.

*Example IV*

A mixture of 145 g. of tall oil A and 33 g. of cyclopentadiene is heated in a stainless steel bomb for one hour at 500° F. The product is a viscous liquid which has the following properties: Color 14 (Hellige); acid number 87; soluble in aromatic and naphtha solvents, and in drying oils. The drop in acid number indicates that about 37 per cent of the acids present in the original reaction mixture are present as esters in the product. When esterified with an equivalent amount of glycerine (100 parts product to 4.6 parts glycerine), this composition makes an excellent drying oil additive, having better drying properties, viscosity, and resistance to water, acid, and alkali than do tall oil-glycerine esters prepared according to known methods.

*Example V*

A mixture of 235 g. of dicyclopentadiene and 115 g. of refined tall oil B (60 per cent fatty acids, 35 per cent rosin acids; acid number 170) is heated in a stainless steel bomb at 500° F. for six hours. The product is distilled to 500° F. at 29 inch vacuum, the distillate being 5.0 g. of oily material. The resin has the following properties: M. P. 190° F.; color 9 (Hellige); acid number 6.9; soluble in aromatic and naphtha solvents, and in drying oils. A 20 gallon bodied linseed oil varnish, 50 per cent solids in mineral spirits, has a 7 color (Hellige) and E viscosity (Gardner). The drop in acid number indicates that about 87.7 per cent of the acids present in the original reaction mixture are present as esters in the product.

*Example VI*

A mixture of 140 g. of tall oil A and 60 g. of cyclopentadiene is heated in a stainless steel bomb, nitrogen atmosphere, for three hours, at 500° F. The product is a liquid of medium viscosity; acid number 57.8; color 10+ (Hellige). When reacted with an equivalent amount of glycerine (100 parts product to 3.3 parts glycerine) a useful synthetic drying oil is formed which considerably extends the natural drying oils in paints and varnishes, as well as improving the drying properties of such vehicles.

*Example VII*

A mixture of 120 g. of tall oil B and 80 g. of cyclopentadiene is heated in a stainless steel bomb at 500° F. for two hours. The product is a viscous, pale colored, clear liquid; acid number 40.0; color 9 (Hellige). When reacted with an equivalent amount of pentaerythritol or glycerine (100 parts product to 2.1 parts glycerine) this material forms products which make excellent short oil length varnishes whose films have high gloss, and which dry very rapidly. The drop in acid number indicates that about 60.8 per cent of the acids present in the original reaction mixture are present as esters in the product.

*Example VIII*

One hundred grams of cyclopentadiene is heated in a bomb at 500° F. for 30 minutes, and to the resulting mixture of clear, viscous, resinous polymers is added 50 g. of tall oil A. This mixture is then heated for five hours at 500° F., the final product being a solid, clear resin with the following properties: M. P. 203° F.; color 12 (Hellige); soluble in aromatic and naphtha solvents, and in bodied drying oils. A 20 gallon bodied linseed oil varnish, 50 per cent solids in mineral spirits, has a 9 color (Hellige), E viscosity (Gardner). The drop in acid number indicates that about 74.3 per cent of the acids present in the original reaction mixture are present as esters in the product.

*Example IX*

A mixture of 70 parts of a commercially available "dicyclopentadiene concentrate," containing about 90 per cent dicyclopentadiene and 30 parts of tall oil A is passed continuously through a tube which is heated at 550° F., with a reaction time of five minutes, at a pressure of 350 to 400 pounds per square inch. The product is a liquid of medium viscosity, and with an acid number of 34.4 which indicates that 32.0 per cent of the acids in the reaction mixture are present as esters in the product. This material when esterified with an equivalent amount of glycerine (100 parts product to 1.8 parts glycerine) gives a satisfactory drying oil substitute which extends the natural drying oils in oleoresinous compositions.

*Example X*

A mixture of 100 parts of another commercial "dicyclopentadiene concentrate," containing about 50 per cent of dicyclopentadiene cyclic diene Diels-Alder polymers and 25 per cent other thermally polymerizable olefins, and 110 parts of tall oil B is heated at 500° F. for four hours in a stainless steel bomb. The product is a light brown, viscous oil; acid number 39.9, calculated back to 100 per cent solids. The drop in acid number indicates that about 55.3 per cent of the acids initially in the reaction mixture are present as esters in the product. This material may be reacted with an equivalent amount of glycerine (100 parts product to 2.1 parts glycerine) to give a satisfactory synthetic drying oil, or with pentaerythritol to give valuable resins soluble in dryin oils.

The foregoing specification and illustrative examples will naturally suggest to those skilled in the art numerous modifications, variations and ramifications of the basic principles of my invention; all these are considered to be comprehended within the scope of my invention as defined by the claims.

I claim as my invention:

1. A process for preparing a new composition of matter which comprises reacting cyclopentadiene and tall oil at a temperature of between 400° F. and 650° F.

2. A process for preparing a new composition of matter which comprises reacting a mixture of cyclopentadiene and tall oil at a temperature between about 400° F. and 650° F. in the liquid phase.

3. A process for preparing a new composition of matter which comprises reacting a mixture of from 5 to 95 parts by weight of cyclopentadiene and from 95 to 5 parts by weight of tall oil at a temperature of 400 to 650° F. and at a superatmospheric pressure adequate to maintain the reactants in the liquid phase.

4. A process according to claim 3 in which the cyclopentadiene is polymerized at a temperature of 400 to 550° F. before being thermally reacted with the tall oil.

5. A process according to claim 3 in which the cyclopentadiene is utilized in the form of its polymers which are capable of depolymerizing at the temperatures employed in the thermal reaction.

6. A process according to claim 3 in which the thermal reaction product is subsequently esterified with a polyhydric alcohol.

7. A product formed in accordance with the process of claim 3.

8. A new resinous composition of matter from the group consisting of the thermal reaction product of cyclopentadiene and tall oil formed at a temperature between 400-650° F., and the polyhydric alcohol ester thereof.

9. As a new resinous composition of matter, the polyhydric alcohol ester of the resinous reaction product of cyclopentadiene and tall oil formed at a temperature between 400° F. and 650° F.

10. A process for preparing a new composition of matter which comprises reacting tall oil and resinous polymerized cyclopentadiene at a temperature of between 400° F. and 650° F.

11. A process for preparing a new composition of matter which comprises polymerizing cyclopentadiene at a temperature of 400 to 550° F. to its polyene resinous polymers, and subsequently reacting these polymers with tall oil at a temperature of between 400° F. and 650° F.

CARL F. PETERS.

REFERENCES CITED

The following references are of record in the file of this patent:

UNITED STATES PATENTS

| Number | Name | Date |
|---|---|---|
| 1,944,731 | Diels et al. | Jan. 23, 1934 |
| 2,340,043 | Clare | Jan. 25, 1944 |
| 2,387,895 | Gerhardt | Oct. 30, 1945 |
| 2,395,452 | Bruson | Feb. 26, 1946 |
| 2,398,889 | Gerhardt | Apr. 23, 1946 |
| 2,443,044 | Lycan et al. | June 8, 1948 |
| 2,468,770 | Morris | May 3, 1949 |
| 2,477,654 | Rummelsberg | Aug. 2, 1949 |